United States Patent
Zoppitelli

(10) Patent No.: US 7,360,994 B2
(45) Date of Patent: Apr. 22, 2008

(54) METHOD OF CONTROLLING VIBRATION DAMPING IN A HELICOPTER, AND APPARATUS IMPLEMENTING THE METHOD

(75) Inventor: Elio Zoppitelli, Velaux (FR)

(73) Assignee: Eurocopter, Marignane Cedex (FR)

( * ) Notice: Subject to any disclaimer, the term of this patent is extended or adjusted under 35 U.S.C. 154(b) by 587 days.

(21) Appl. No.: 11/069,987

(22) Filed: Mar. 3, 2005

(65) Prior Publication Data
US 2006/0056973 A1    Mar. 16, 2006

(30) Foreign Application Priority Data
Mar. 3, 2004  (FR) .................................. 04 02169

(51) Int. Cl.
*B64C 21/51* (2006.01)

(52) U.S. Cl. .................. 416/107; 416/140; 416/500

(58) Field of Classification Search ................ 416/106, 416/107, 134 A, 140, 500; 244/17.1
See application file for complete search history.

(56) References Cited

U.S. PATENT DOCUMENTS

| | | | |
|---|---|---|---|
| 3,638,885 A | | 2/1972 | Reed |
| 5,219,430 A | * | 6/1993 | Antoine .................. 267/140.12 |
| 6,454,206 B2 | * | 9/2002 | Vincent .................... 244/17.27 |
| 6,676,074 B2 | * | 1/2004 | Zoppitelli et al. .......... 416/106 |
| 2003/0012650 A1 | | 1/2003 | Ferullo |
| 2003/0146343 A1 | | 8/2003 | Zoppitelli et al. |

FOREIGN PATENT DOCUMENTS

| | | |
|---|---|---|
| EP | 1 130 280 | 9/2001 |
| FR | 2 826 933 | 1/2003 |
| FR | 2 835 506 | 8/2003 |

* cited by examiner

*Primary Examiner*—Igor Kershteyn
(74) *Attorney, Agent, or Firm*—Young & Thompson

(57) ABSTRACT

The present invention relates to a method of controlling a drag damper for a helicopter blade under all operating configurations of the helicopter, the method consisting in:
  a) measuring the elongation of the damper;
  b) amplifying the measured signal and filtering out noise;
  c) isolating the natural response of the blade corresponding to the drag movement of the blade from the forced response imposed by a rotor driving the blades; and
  d) analyzing in real time the natural response and adjusting the damping as a function of the analysis.

12 Claims, 2 Drawing Sheets

METHOD OF CONTROLLING VIBRATION DAMPING IN A HELICOPTER, AND APPARATUS IMPLEMENTING THE METHOD

The present invention relates to a technical field of helicopters, and more particularly to the field of optimizing the conditions of use said helicopters.

BACKGROUND OF THE INVENTION

Helicopters have rotors driving blades. Rotation of the blades leads to drag movements that are known to manufacturers. Drag movements give rise to vibration in the form of oscillations, degrading the stability of the helicopter and comfort in flight. It is thus important to guarantee that there is no instability of the helicopter, in particular no ground resonance and no air resonance, the principles of which are explained in the paragraphs below. Drag movement also induces longitudinal and lateral forces in the fuselage that generate pitch and roll movements, and also parasitic movements in the drive system.

On the ground, the helicopter may be subject to a phenomenon of particular mechanical coupling known as "ground resonance" in the field of aviation. Thus, at a given speed of rotation for the rotor, the fuselage presents a vibration mode and the blades present a drag vibration mode. The blade movements induce forces on the rotor, giving rise to movements in the structure which in turn have an effect on the movements of the blades. If the frequencies of the fuselage and rotor modes are close enough together and if these modes are insufficiently damped, then the drag movements of the blades and the movements of the structure will amplify each other mutually and run the risk of becoming dangerous.

In order to act on this phenomenon, in addition to optimizing the stiffness and the damping of the landing gear, use is made of a drag damper mounted between two successive blades or between one blade and the rotor in order to avoid such coupling, by modifying the frequency of the drag movement, and where appropriate by applying damping to the drag vibration mode.

In flight, the helicopter can be subject to a resonance phenomenon of the same type as that described above, but coming from coupling between the drag vibration mode of the blades and the pendulum mode of oscillation of the fuselage. This phenomenon, known as "air resonance" is generally aggravated by severe flight configurations, such as turning for example, since the large amplitude of the forced dynamic response of the dampers as imposed by the rotor driving the blades then reduces their damping characteristics on the natural response which is at a frequency that is lower than that of the forced response.

If a drag damper presents a high degree of damping, then the hub which connects the blades to the rotary drive shaft of the rotor will be subjected to very large forces throughout the time of flight, leading to high levels of fatigue and to a risk of mechanical parts rupturing. This can be acceptable for stages of flight that are relatively short. In contrast, in a normal flight configuration, the drag dampers ought not to damp vibration unless it is generating instability, for example during particular flight configurations such as turning, etc. This can serve to reduce heating and consequently to reduce the risks of premature wear.

The degree to which the drag dampers damp therefore needs to adapt to operating and flight configurations, if it is desired to limit the forces on the hub when there is no risk of resonance.

Drag dampers are known in which it is possible to control the throttling of oil flowing from one chamber to another and back again via special valves. By way of example, such a damper presents a force/displacement relationship that corresponds to damper force depending on the amplitude of oscillation, and suitable for reducing vibration of the helicopter.

Such dampers often present reliability problems, and they are also very expensive.

OBJECTS AND SUMMARY OF THE INVENTION

The present invention seeks to remedy the drawbacks of known dampers, and to control the vibration generated by the drag movements of the blades in all operating configurations of the helicopter. The present invention thus serves to control instability phenomena, in particular ground resonance and air resonance, while avoiding premature wear of mechanical parts and of the dampers.

The object of the invention is achieved by a method of controlling a drag damper for a helicopter blade under all operating configurations of the helicopter, the method consisting in;

a) measuring the elongation of the damper;

b) amplifying the measured signal and filtering out noise;

c) isolating the natural response of the blade corresponding to the drag movement of the blade from the forced response imposed by a rotor driving the blades; and d) analyzing in real time the natural and forced responses, and adjusting damping as a function of said analysis.

In an implementation, the method consists in continuously repeating steps a) to d) so long as the blades are in rotation.

In a preferred implementation, the method consists in using a magneto-rheological damper and in controlling the electric currents fed to said damper.

By way of example, step d) consists in determining the elongation, the speed, or the acceleration that results from said natural and forced drag responses.

By way of example, the method consists in determining the functions representative, as a function of time, of the speed drag natural response $d'(t)$ and of the speed forced response $D'(t)$, in calculating the product $P(t)=D'(t).d'(t)$, and in determining whether the product $P(t)$ is positive or negative in order to implement step d).

For example, the method consists in increasing damping if the product $P(t)$ is positive.

In another implementation, the method consists in calculating the position of the center of gravity of the blades, in determining an offset between the center of gravity of the blades and the axis of the rotor, and in transforming said offset into a control signal acting on the damper so as to move the center of gravity of the blades towards the axis of the rotor.

The object of the present invention is also achieved with apparatus for controlling the damping of the drag movement of the blades of a helicopter, the apparatus serving to implement the method as defined above and comprising:

a drag damper associated with each blade;

an elongation sensor connected to the damper;

an amplifier for amplifying the signals delivered by the sensor;

signal processor means for separating the drag natural response from the forced response of each blade; and analysis and control means acting on the damper to adjust its damping characteristics.

This apparatus presents the advantage of being controlled and consequently easily adjustable to different applications. The dampers can thus be controlled so as to damp low frequency vibrations (lower than the frequency of rotation of the rotor) only when necessary. There is thus no unnecessary dissipation of energy.

In an embodiment, the apparatus includes a microprocessor controlling the analysis and control frequency.

The drag damper is preferably a magneto-rheological damper.

Such a damper presents the advantage of operating at temperatures lying in the range −40° C. to +150° C. Magneto-rheological fluids present very little variation in stiffness over this temperature range. In addition, the impurities that appear during manufacture and use of the damper do not spoil its operation. Magneto-rheological dampers can also be controlled by electric current of the order of 1 amp (A) to 2 A at low voltage (12 volts (V) to 24 V). Their characteristics vary with temperature, but this variation can be compensated by adjusting the magnetic field. The response time of such dampers is also short. The changeover time to go from 10% to 90% of the force generated by the damper for a given excitation is 8 milliseconds (ms).

Another advantage is associated with the great simplicity with which such dampers can be controlled.

The present invention also provides a helicopter rotor including damper apparatus for damping blade drag movements, as described above.

BRIEF DESCRIPTION OF THE DRAWINGS

Other characteristics and advantages also appear from the following detailed description made with reference to the accompanying drawings given by way of non-limiting example, and in which.

MORE DETAILED DESCRIPTION

Figure 1:
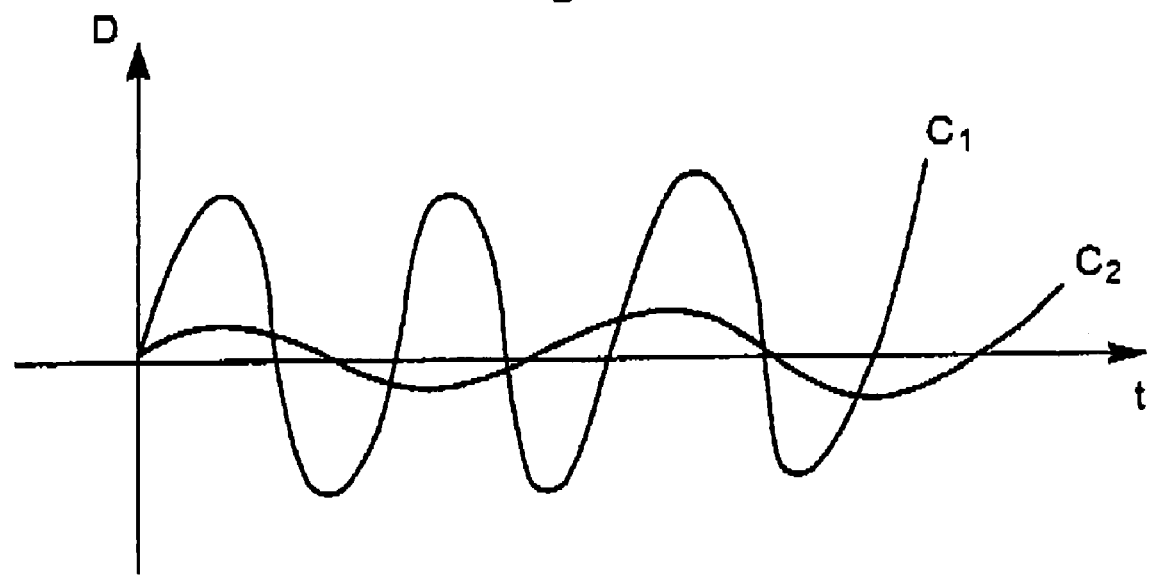
FIG. 1 shows the two-frequency vibration of helicopter blades.

The drag movements of the blades generate oscillations of two types. The first type of oscillation presents the same frequency as that of the helicopter rotor, and it is referred to as the forced frequency. The second type of oscillation corresponds to drag oscillations presenting a natural frequency and an amplitude that are smaller than the frequency and the amplitude of the oscillations of the first type. These two types of oscillation are referred to respectively as the forced response and the natural response of the blades. These responses are shown diagrammatically in FIG. 1 by means of curves C1 and C2.

Figure 2:
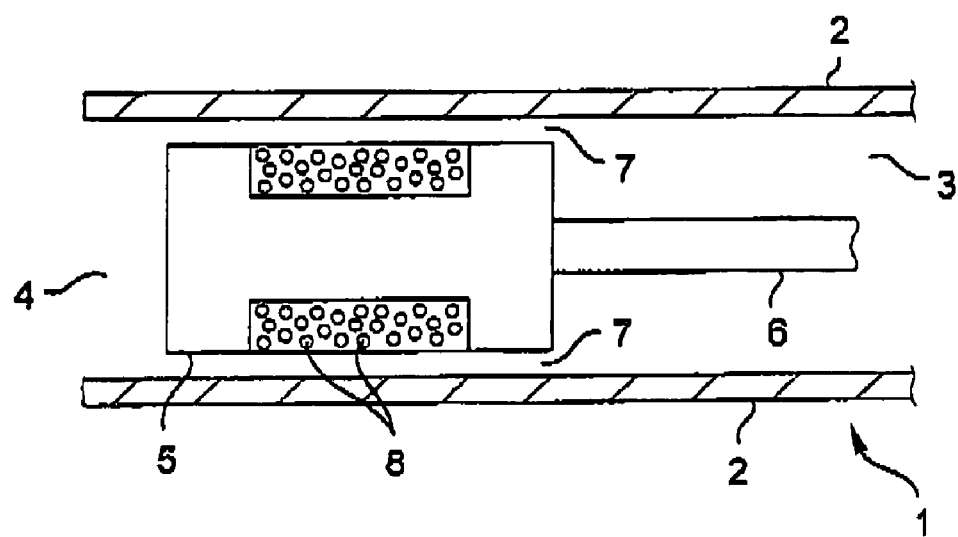
FIG. 2 is a fragmentary diagram of a magneto-rheological damper used in the method in accordance with the invention.

The control apparatus of the invention comprises a drag damper 1 associated with each blade. The damper is preferably a magneto-rheological damper 1, shown diagrammatically and in part in FIG. 2. The damper 1 comprises a frame 2 defining a first chamber 3 and a second chamber 4. The magneto-rheological fluid is moved from one chamber to the other and back again by means of a piston 5 that moves in the frame 2. The piston 5 is actuated by a rod 6 and presents dimensions that allow a passage 7 to be left for the fluid between the two chambers 3 and 4. An electric coil 8 is mounted, e.g. on the periphery of the piston 5, in order to generate a magnetic field. The operation of such a magneto-rheological damper is already known.

The control apparatus also includes an elongation sensor 9 connected to the drag damper 1 in order to measure the displacement of the rod 6 relative to the frame 2. An amplifier 10 may also be provided to amplify the signal delivered by the sensor 9.

The apparatus further comprises signal processor means for separating the drag natural response from the forced response for each blade, which signal processor means are associated with analysis and control means acting on the dampers to adjust their damping characteristics.

Figure 3:
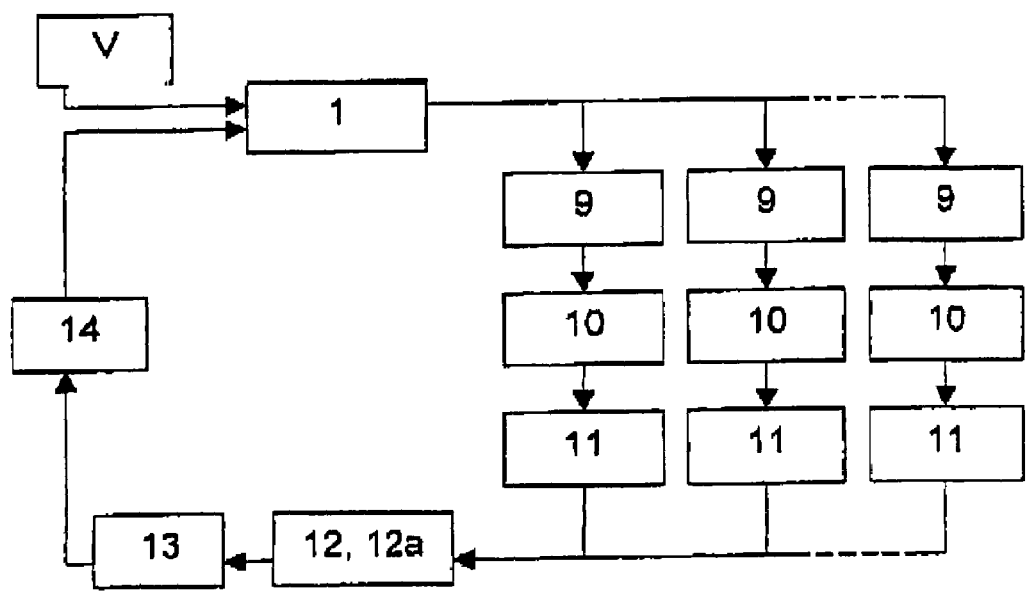
FIG. 3 is a block diagram of an implementation of the method of the invention.

In the implementation shown diagrammatically in FIG. 3, the natural and forced responses are separated by filter moans 11 serving to eliminate high frequencies from the measured response. The signal processor means can thus separate the two-frequency vibrations to which the blades are subjected into a forced frequency signal and a drag natural frequency signal that is of smaller amplitude.

The control apparatus further comprises calculation means 12a delivering the displacement of the center of gravity of each blade relative to the rotor. Electronic processor means 13 are also provided to control a voltage generator 14 connected to the drag damper 1 as a function of the results obtained by the calculation means 12a and the signal processor means 12. These results reflect the vibrations V transmitted to the drag damper 1. The calculation means advantageously comprise a microprocessor. The microprocessor controls the analysis and control frequency, for example. A drag damper 1, and specifically a magneto-rheological damper, can thus be controlled in a manner that is reliable, fast, and accurate.

Figure 4:
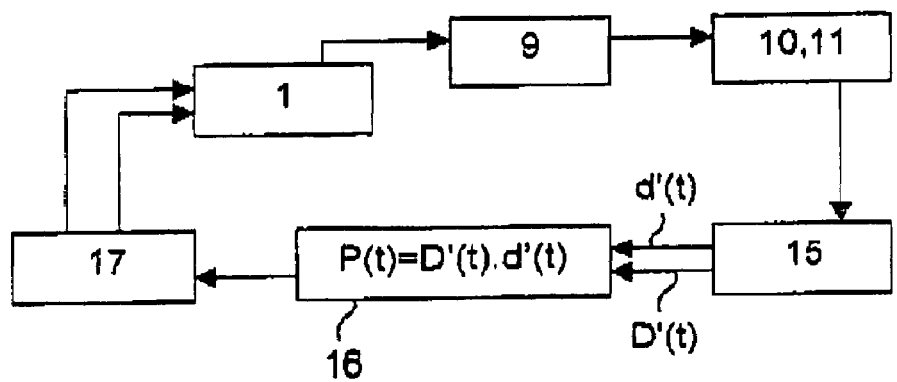
FIG. 4 is a diagram of another implementation of the method of the invention.

In another implementation, shown diagrammatically in FIG. 4, the signal coming from the filter means 11 is fed to a signal resolver unit 15 for separating the function corresponding to the speed forced response D'(t) from the function corresponding to the speed natural response d'(t). D'(t) and d'(t) are speed responses as a function of time. A microprocessor type calculator 16 is then used to calculate the product P(t)=D'(t).d'(t).

The apparatus in this example includes a control system 17 integrating an electric current generator connected to the damper 1. On the basis of the characteristics of the calculated signal P(t), the control system determines whether the drag damper 1 should or should not be activated.

The control apparatus shown diagrammatically by way of example in FIGS. 3 and 4 thus serves to implement the method of the invention in two different implementations.

The method of controlling the drag damper 1 consists in measuring its elongation, in amplifying the measured signal, and in filtering out the noise accompanying said signal. Thereafter the natural response of the blade is separated from its forced response. This makes it possible to identify and analyze the vibrations to which the helicopter is subjected.

The steps described above can be repeated continuously so long as the blades are in rotation, for example. This makes it possible to act both on the ground resonance phenomenon and on the air resonance phenomenon.

It is also possible from the preceding determination to calculate the position of the center of gravity of the blades and to determine an offset between said center of gravity of the blades and the axis of the rotor.

This offset is then transformed into a control signal acting on the damper 1, in order to reduce this offset to a value that is small or zero. For example, in difficult stages of flight, it is possible to reduce vibration in intelligent manner without thereby generating additional negative effects, such as fatigue or premature wear of component parts of the helicopter.

In a variant implementation of the invention, the method consists in determining the functions representative, as a function of time of the speed drag natural response d'(t) and the speed forced response D'(t). Thereafter, the product of those two functions is calculated, i.e. P(t)=D'(t).d'(t), in order to determine whether P(t) is positive or negative, when implementing step d). By way of example, the method consists in increasing damping if P(t) is positive.

This makes it possible to ensure that damping is applied strongly only when such strong damping contributes to stabilizing the natural response, i.e. when the resultant force opposes the natural movement. It can be seen that the amplitude of displacement relating to the forced response is greater than that relating to the natural response. The resulting force on the damper 1 always counters the predominant signal, i.e. the forced response, and the damper 1 always dissipates energy on the forced response. Unfortunately, it can happen that the force acts in the direction of the natural response when the product P(t) is negative. Under such circumstances, the drag damper 1 is working with the drag mode. This is precisely what needs to be avoided in order to reduce vibration. It is therefore necessary to reduce damping under such circumstances corresponding to the product P(t) being negative.

The magneto-rheological drag damper 1 can thus, in a particular use, be activated only to increase damping when the product P(t) is positive. The control system 17 operates, for example, on the ON/OFF principle, i.e. it induces a maximum magnetic field or no magnetic field in the magneto-rheological damper 1.

What is claimed is:

1. A method of controlling a drag damper for a helicopter blade under all operating configurations of the helicopter, the method consisting in:
   a) measuring the elongation of the damper;
   b) amplifying the measured signal and filtering out noise;
   c) isolating the natural response of the blade corresponding to the drag movement of the blade from the forced response imposed by a rotor driving the blades; and
   d) analyzing in real time the natural response and adjusting the damping as a function of said analysis.

2. A method according to claim 1, consisting in continuously repeating steps a) to d) so long as the blades are in rotation.

3. A method according to claim 1, consisting in using a magneto-rheological damper and in controlling the electric currents fed to said damper.

4. A method according to claim 1, wherein step d) consists in determining the elongation, the speed, or the acceleration that results from said drag natural response.

5. A method according to claim 1, consisting in determining the functions representative, as a function of time, of the speed drag natural response d'(t) and of the speed forced response D'(t), in calculating the product P(t)=D'(t).d'(t), and in determining whether the product P(t) is positive or negative in order to implement step d).

6. A method according to claim 5, consisting in increasing damping if the product P(t) is positive.

7. A method according to claim 4, consisting in calculating the position of the center of gravity of the blades, in determining an offset between the center of gravity of the blades and the axis of the rotor, and in transforming said offset into a control signal acting on the damper so as to move the center of gravity of the blades towards the axis of the rotor.

8. Apparatus for controlling damping of the drag movement of the blades of a helicopter, the apparatus implementing the method according to claim 1 and comprising:
   a drag damper associated with each blade;
   an elongation sensor connected to the damper;
   an amplifier for amplifying the signals delivered by the sensor;
   signal processor means for separating the drag natural response from the forced response of each blade; and
   analysis and control means acting on the damper to adjust its damping characteristics.

9. Apparatus according to claim 8, including a microprocessor controlling the analysis control frequency.

10. Apparatus according to claim 8, wherein said drag damper is a magneto-rheological damper.

11. Apparatus according to claim 8, wherein said analysis means comprise means for calculating the position of the center of gravity of said blades from the signals delivered by the elongation sensors for all of the blades.

12. A helicopter rotor including apparatus for damping the drag movement of the blades according to claim 8.

* * * * *